Patented Jan. 6, 1925.

1,522,054

UNITED STATES PATENT OFFICE.

HANS HAHL AND WALTER KROPP, OF ELBERFELD, GERMANY, ASSIGNORS TO FARBEN-FABRIKEN VORM. FRIEDR. BAYER AND CO., OF LEVERKUSEN, NEAR COLOGNE-ON-THE-RHINE, GERMANY.

BASIC BISMUTH SALT OF GUAIACOL CARBOXYLIC ACID.

No Drawing.  Application filed April 15, 1924.  Serial No. 706,749.

*To all whom it may concern:*

Be it known that we, HANS HAHL and WALTER KROPP, citizens of Germany, residing at Elberfeld, in the State of Prussia, Germany, have invented new and useful Improvements in a Basic Bismuth Salt of Guaiacol Carboxylic Acid, of which the following is a specification.

Our invention concerns the production of the hitherto unknown basic bismuth salt of guaiacol carboxylic acid having most probably the following formula:

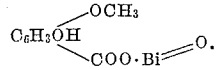

The new product has proved to be a valuable remedy against luetic diseases. Its oily emulsions are used for subcutaneous injections. The anæsthetic properties of the guaiacol carboxylic acid appeases the pain of injection. The new product contains about 53–56 per cent bismuth and is a whitish-yellow powder insoluble in water and organic solvents. It can be obtained by treating the guaiacol carboxylic acid with bismuth oxide.

In order to illustrate our invention, the following example is given:—

200 parts by weight of powdered bismuth nitrate are dissolved in 150–200 parts by weight of a 30 per cent acetic acid. It is filtered and the filtrate is rendered slightly alkaline with caustic soda solution. Subsequently the precipitate is treated with water until it is neutral; it is then stirred up with hot water and the bismuth oxide thus obtained is added to a boiling solution of 200 parts by weight of guaiacol carboxylic acid in 20000 parts by weight of water. The mixture which has to be well stirred is then boiled during three hours in a vessel which is provided with a reflux condenser. It is filtered while hot, the precipitate is washed with hot water until neutral and dried and pulverized.

We claim:—

The herein described new basic bismuth salt of guaiacol carboxylic acid having most probably the formula:

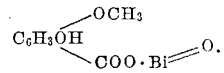

being a whitish yellow powder insoluble in water and in the usual organic solvents, being a valuable anti-syphilitic for subcutaneous use in an oil emulsion, substantially as described.

In testimony whereof we have hereunto set our hands.

HANS HAHL.
WALTER KROPP.